(12) United States Patent
Wang et al.

(10) Patent No.: US 10,654,105 B2
(45) Date of Patent: May 19, 2020

(54) FLAKE METAL LITHIUM POWDER AND PREPARING METHOD OF THE SAME

(71) Applicant: Chengdu Eminent New Energy Technology Co., LTD, Chengdu (CN)

(72) Inventors: Yuanfang Wang, Chengdu (CN); Jianguo Dai, Chengdu (CN); Yijun Fan, Chengdu (CN); Chengsheng Hu, Chengdu (CN); Guozheng Ping, Chengdu (CN); Pingfei Lu, Chengdu (CN); Suxia Chen, Chengdu (CN); Qianqian Wang, Chengdu (CN)

(73) Assignee: CHENGDU EMINENT NEW ENERGY TECHNOLOGY CO., LTD, Chengdu, Sichuan (CN)

( * ) Notice: Subject to any disclaimer, the term of this patent is extended or adjusted under 35 U.S.C. 154(b) by 0 days.

(21) Appl. No.: 16/134,532

(22) Filed: Sep. 18, 2018

(65) Prior Publication Data

US 2019/0388973 A1    Dec. 26, 2019

(30) Foreign Application Priority Data

Jun. 20, 2018    (CN) .......................... 2018 1 0634676

(51) Int. Cl.
*B22F 1/00*     (2006.01)
*B22F 9/04*     (2006.01)

(52) U.S. Cl.
CPC .............. *B22F 9/04* (2013.01); *B22F 1/0055* (2013.01); *B22F 2009/045* (2013.01); *B22F 2301/054* (2013.01); *B22F 2304/10* (2013.01); *Y10T 428/12014* (2015.01)

(58) Field of Classification Search
None
See application file for complete search history.

(56) References Cited

U.S. PATENT DOCUMENTS

| | | | |
|---|---|---|---|
| 6,022,639 A * | 2/2000 | Urry ....................... | H01M 4/06 429/229 |
| 8,979,972 B2 * | 3/2015 | Chung .................. | B22F 1/0055 75/345 |

FOREIGN PATENT DOCUMENTS

WO    WO-2017155700 A1 *   9/2017   ............ H01M 8/188

* cited by examiner

*Primary Examiner* — Seth Dumbris
(74) *Attorney, Agent, or Firm* — Dragon Sun Law Firm, PC; Jinggao Li, Esq.

(57) ABSTRACT

The present disclosure discloses flake metal lithium powder and a preparing method thereof; by ultrasonically pulverizing the metal lithium placed in a low-viscosity inert organic resolvent using a vacuum ultrasonic pulverization method, a micrometer scale flake metal lithium powder is prepared. The metal lithium powder may be used as an anode material for a lithium cell or lithium ion cell. The present method has advantages of high product purity, simple operation, low processing temperature, low cost, high efficiency, and less demanding on equipment, etc., and has a high prospect of being applied to mass production of metal lithium powder.

1 Claim, 4 Drawing Sheets

FLAKE METAL LITHIUM POWDER AND PREPARING METHOD OF THE SAME

CROSS-REFERENCE TO RELATED APPLICATIONS

This application claims the priority of CN Application No. 201810634676.4, filed Jun. 28, 2018, the content of which is incorporated herein in the entirety by reference.

FIELD

Embodiments of the present disclosure relate to flake metal lithium powder and a preparing method of the same.

BACKGROUND

Metal lithium powder is widely applied to the fields of preparing lithium alkylide, catalysts, additives, and lithium cells, etc. As the metal lithium can hardly be pulverized into powders by conventional pulverization methods such as mechanical pulverization due to its high reactivity, larger viscosity, lower melting point (180.5° C.) and lower density (0.534 g/cm3), a melt-dispersion method is currently prevalently adopted to prepare the metal lithium powder. The metal lithium melt-dispersion method is a method of heating the metal lithium in a dispersant, stirring at a high speed to disperse the lithium droplets, then cooling, centrifuging or filtering, rinsing, and drying to form lithium powder. The lithium powder prepared in this method is in a spherical shape; during the preparing process, a high boiling-point hydrocarbon oil, a low boiling-point hydrocarbon oil for rinsing, a relatively high operation temperature of nearly 200° C., and an inert protection atmosphere are needed; such that this preparation method has problems such as a high preparation cost, a low preparation efficiency, being highly demanding on equipment, and inability to prepare a non-spherical lithium powder, etc.

Ultrasonic pulverization is an approach of cavitating a liquid by leveraging the dispersion effect of ultrasonic in the liquid to thereby pulverize the solid particles or cell tissues in the liquid. CN107297507 discloses a method of preparing a metal lithium powder by ultrasonically pulverizing the metal lithium in an ion liquid at a temperature higher than 100° C. However, the ion liquid leveraged in this method has a high liquid viscosity and a high boiling point; moreover, the operating temperature reaches 100° C. above; at this point, the cavitation effect of the ultrasonic is weak, and the efficiency of converting the ultrasonic energy to the mechanical pulverization energy is low, such that it is hard to achieve a desired metal lithium pulverization effect and efficiency.

SUMMARY

An objective of the present disclosure is to provide flake metal lithium powder and a preparing method for the same. As a method of preparing non-spherical lithium powder with a simple process, the present disclosure solves the technical difficulties such as high cost, low efficiency, being demanding on equipment, and inability to prepare irregular lithium powder, etc., in the existing lithium powder preparing method.

To achieve the objective above, the present disclosure adopts the following technical solution:

Flake metal lithium powder has a thickness of 1~300 μm and a width-to-thickness ratio of 2~40. The width-to-thickness ratio refers to a ratio of the thickness to the width of the flake metal lithium power.

A method of preparing the flake metal lithium powder comprises a process of:

a) placing the metal lithium into an inert organic solvent, hermetically sealing, and vacuum-pumping;

b) performing ultrasonic processing at a temperature lower than lithium melting point;

c) filtering and drying the processing liquid to obtain flake metal lithium powder.

The metal lithium is a lithium foil, a lithium strip, or a lithium wire, with a thickness or diameter being less than 1 mm. The metal lithium may be directly purchased, or may be obtained by operations of rolling, grinding, and ball milling a lithium ingot, a lithium plate, or lithium grains.

A mass percentage of the metal lithium in the organic solvent is 0.01~30%.

The inert organic solvent includes, but not limited to, a hydrocarbon solvent and a carbonic ester solvent, which may also be a hybrid solvent formed by one or more kinds of solvents. Exemplary solvents include: cyclohexane, petroleum ether, dimethyl carbonate, 1,3-dioxolane, N-methylpyrrolidone, and ethyl acetate. To improve properties of the lithium powder such as dispersion or stability, an appropriate amount of one or more of dispersants, a surface modifier, or a protectant in the organic solvent before or after ultrasonic processing, such as oleic acid, liquid paraffin, methyl silicone oil, etc.

A viscosity of the organic solvent ≤100 mPa·s. If the organic solvent has a too high viscosity, the ultrasonic energy fades fast in the solvent, and the pulverization effect of the metal lithium is attenuated or even lost.

An ultrasonic power for the ultrasonic processing is 50~5000 W, preferably 100~3000 W.

A duration of the ultrasonic processing is 1~120 min.

The ultrasonic processing temperature should be generally lower than the melting point (180.5° C.) of lithium, so as to obtain non-spherical metal lithium powder. The processing temperature is preferably 10~100° C., more preferably 20~90° C.

A vacuum degree of the vacuum-pumping operation ≤0.01 MPa. The vacuum-pumping operation facilitates removal of dissolved oxygen and trace water in the organic solvent and meanwhile facilitates the cavitation effect of vapor cavitation induced by the ultrasonic, and thus significantly improves ultrasonic pulverization efficiency.

The present disclosure provides a novel method of preparing a micron-order flake lithium powder by pulverizing low melting-point metal lithium in a liquid using vacuum ultrasonic. The vacuum operation may remove water and dissolved oxygen easily reacting with the metal lithium in the solvent to thereby reduce side reaction of the metal lithium; the vacuum ultrasonic processing may instantly form, on the surface of the metal lithium, a considerable amount of vapor bubble cavities that have a higher impact wave crushing capability than air bubble cavities, such that a large number of cracks may be formed at the metal lithium surface within a short time, thereby pulverizing the metal lithium, which dramatically enhances the efficiency of preparing the metal lithium powder and reducing the side reaction time of the metal lithium powder. The present method has advantages of high product purity, simple operation, low processing temperature, low cost, high efficiency, and less demanding on equipment, etc. The flake lithium powder prepared according of the present disclosure may be applied to a lithium cell or a lithium ion cell, which may solve the problem of low initial Coulomb efficiency of lithium ion cells by "lithium replenishing".

DETAILED DESCRIPTION OF EMBODIMENTS

Hereinafter, the present disclosure will be described in further detail with reference to specific embodiments in combination with FIGS. 1~5, but the protection scope of the present disclosure is not limited thereto.

Embodiment 1

Figure 1:
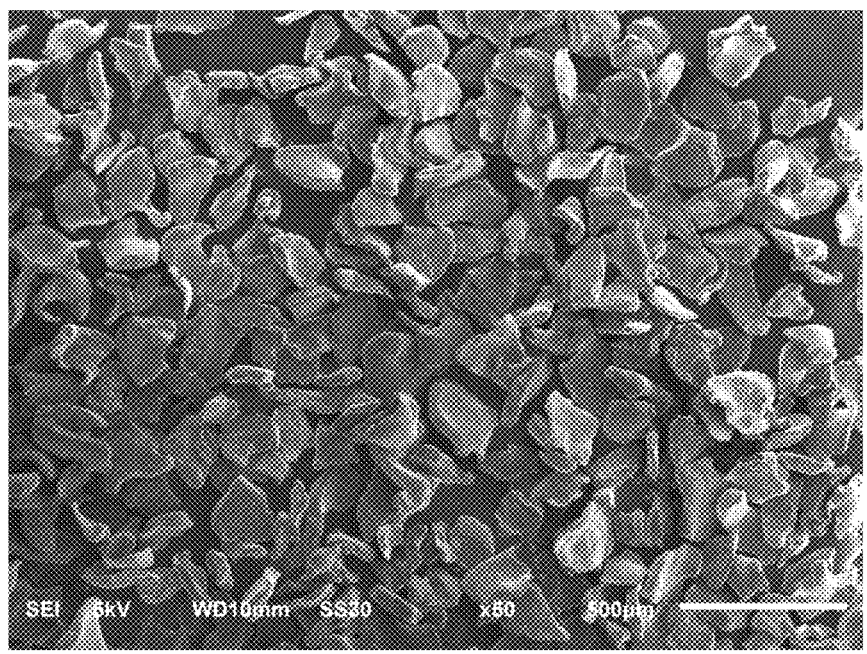
FIG. 1 is a scanning electron microscope (SEM) image of metal lithium powder prepared according to embodiment 1 of the present disclosure.
Figure 2:
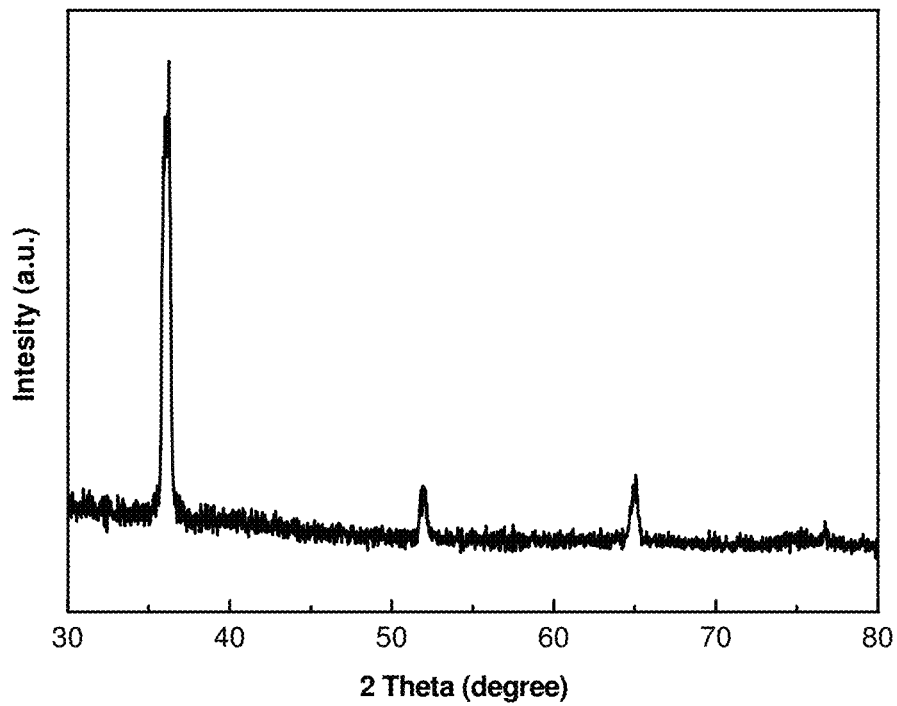
FIG. 2 is an X-ray diffraction (XRD) pattern of the metal lithium powder prepared according to embodiment 1 of the present disclosure.

Placing a 5 g battery-grade lithium foil (with a thickness of 0.05 mm) into a 200 ml plastic bottle loaded with 45 g cyclohexane; vacuum-pumping to 0.06 MPa, hermetically sealing, processing for 15 min in a 100 W ultrasonic instrument at a processing temperature of 60° C., filtering and vacuum drying, and then obtaining metal lithium powder. FIG. 1 is an SEM image of the prepared metal lithium powder. It may be seen from the image that the lithium powder is in a flake structure, with a thickness of 10~50 µm, a width of 100~300 µm, and a width-to-thickness ratio of approximately 6~30. FIG. 2 is a typical XRD pattern of the prepared metal lithium powder, showing that it is a pure phase of Li, without other impurity phases.

Rolling the metal lithium powder on a Cu foil as a working electrode, and with the metal lithium plate as a counter electrode, a 1 mol/L $LiPF_6$ EC/DMC (with a volume ratio being 1:1) as the electrolyte, a Cellgard 2400 as the separator, to make a 2032-type coin cell. Testing the galvanostatic charging/discharging performance of the cell using Wuhan LAND cell testing system (LAND CT2001A).

Figure 3:
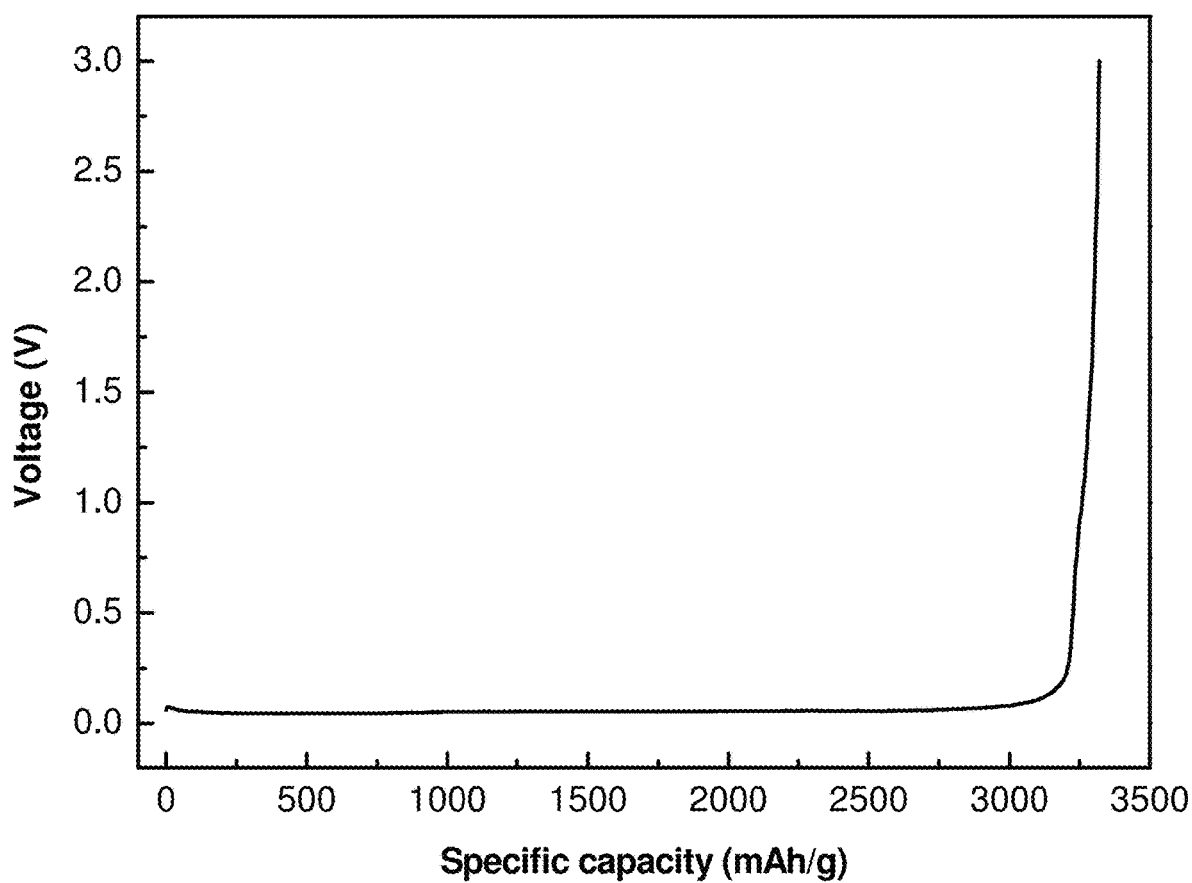
FIG. 3 is a discharge profile of the metal lithium powder prepared according to embodiment 1 of the present disclosure.
Figure 4:
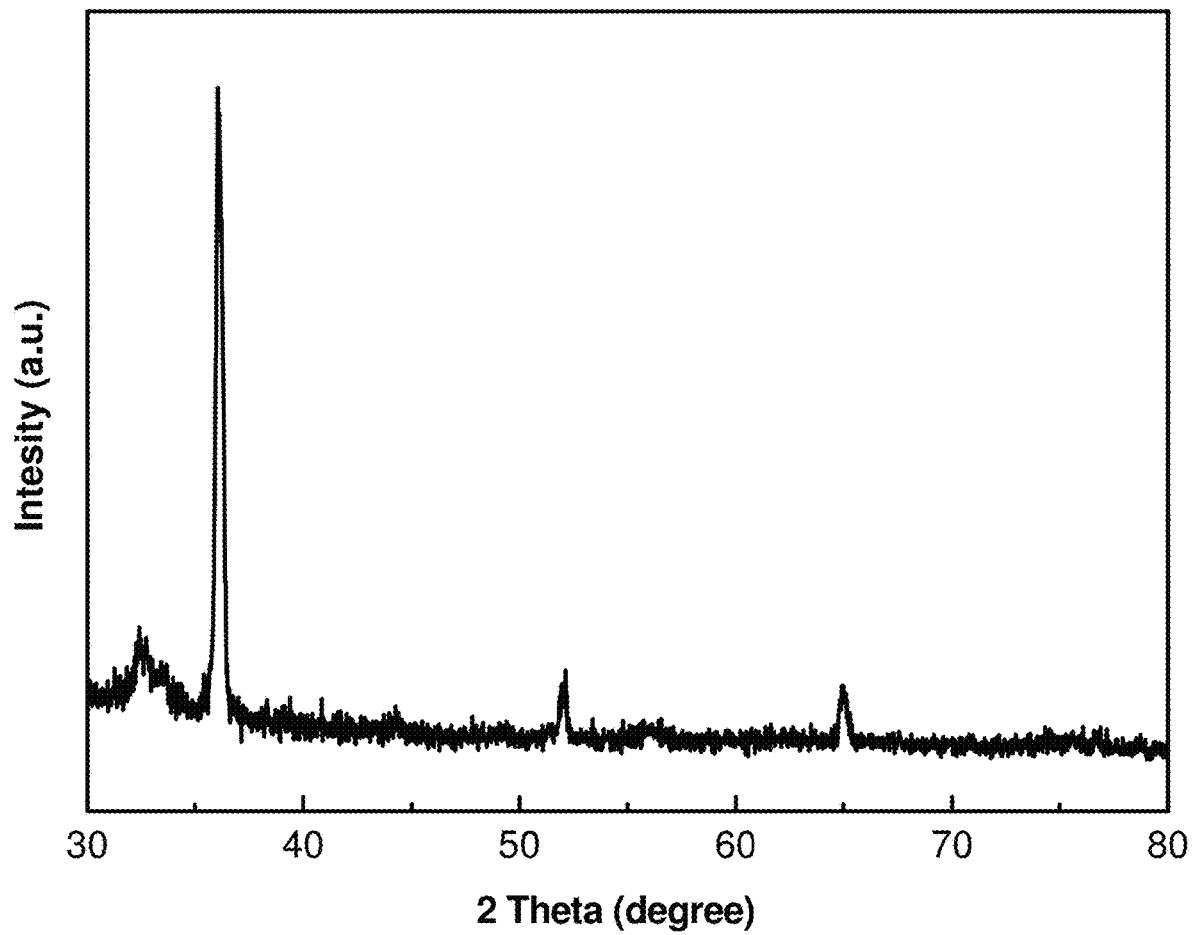
FIG. 4 is an X-ray diffraction (XRD) pattern of the metal lithium powder prepared according to control example 1.
Figure 5:
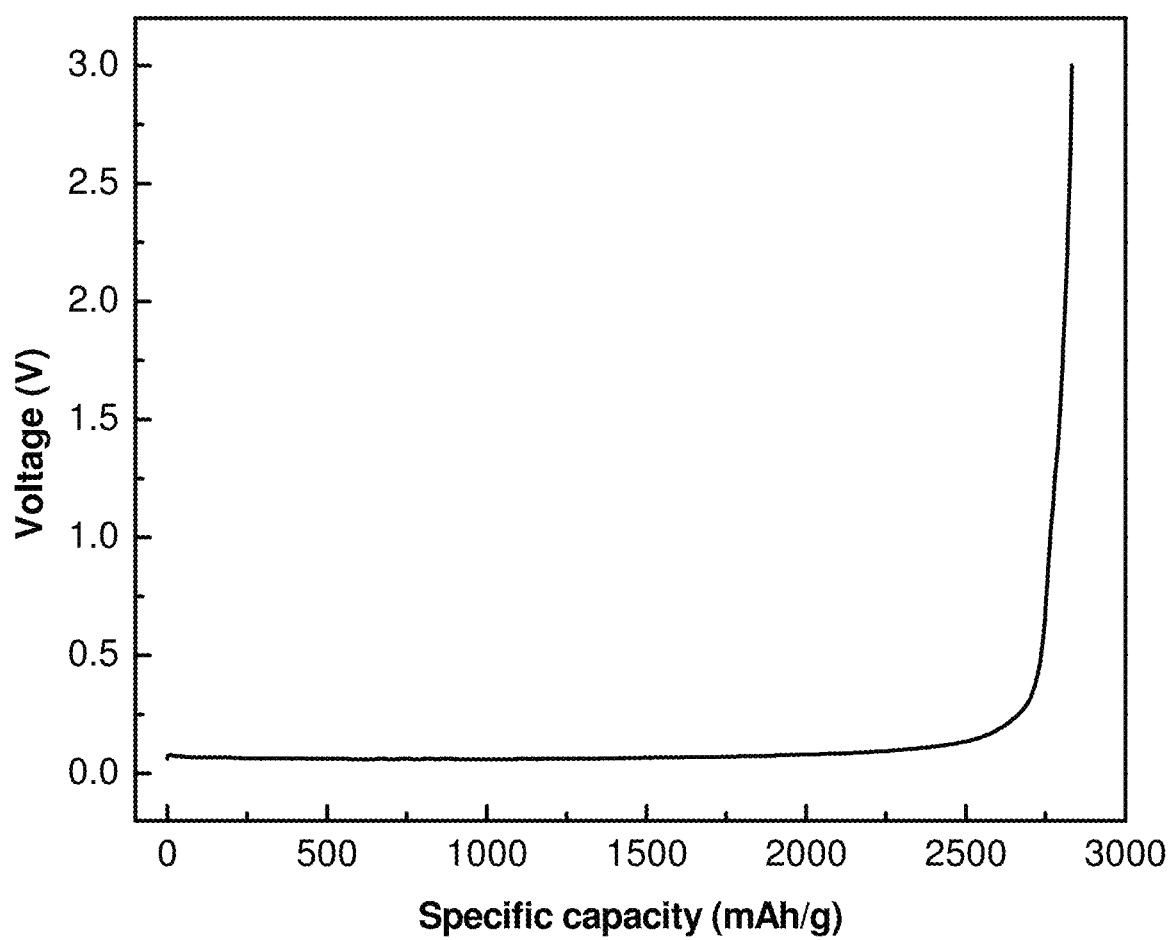
FIG. 5 is a discharge profile of the metal lithium powder prepared according to control example 1.

FIG. 3 is a discharge profile of the metal lithium powder anode prepared according to embodiment 1 of the present disclosure. The discharge capacity of the metal lithium powder may reach 3307 mAh/g, 85.7% of its theoretical lithium discharge capacity (3860 mAh/g). The result shows that the flake metal lithium powder may be used as an anode material for a lithium cell or a lithium ion cell.

Embodiment 2

Placing a 0.5 g battery-grade lithium foil (with a thickness of 0.05 mm) into a 50 ml plastic bottle loaded with 9.5 g dimethyl carbonate; vacuum-pumping to 0.06 MPa, hermetically sealing, processing for 5 min in a 100 W ultrasonic instrument at a processing temperature of 60° C., filtering and vacuum drying to remove the solvent, and then obtaining metal lithium powder. The resulting lithium powder is in a flake structure, with a thickness of 5~50 µm, a width of 50~200 µm, and a width-to-thickness ratio of approximately 4~40. The result shows that this kind of the inert solvent has an impact on the lithium powder size and the pulverization efficiency.

Embodiment 3

Placing a 10 g battery-grade lithium strip (with a thickness of 0.5 mm) into a 200 g 1,3-dioxolane; vacuum-pumping to 0.06 MPa, hermetically sealing, processing for 3 min in a 600 W ultrasonic instrument, filtering and vacuum drying to remove the solvent, and then obtaining metal lithium powder. The resulting lithium powder is in a flake structure, with a thickness of 3~50 µm, a width of 30~150 µm, and a width-to-thickness ratio of approximately 3~50. The result shows that the power of the ultrasonic pulverizer has a significant impact on the efficiency of pulverizing the lithium powder.

Embodiment 4

Rolling 0.5 g lithium grains (with a thickness of 2 mm) into thin-sheet with a thickness of about 0.2 mm; placing the thin sheet into a 50 ml plastic bottle loaded with 9.5 g dimethyl carbonate; vacuum-pumping to 0.06 MPa and hermetically sealing, processing for 5 min in a 100 W ultrasonic instrument at a processing temperature of 60° C., filtering and vacuum drying to remove the solvent, and then obtaining flake metal lithium powder. If lithium grains of this size are pulverized under the same condition without being thinned through mechanical rolling, even the processing duration is prolonged to 120 min, it is still hard to produce lithium powder. The result shows that the size of metal lithium before pulverization also has a significant impact on the efficiency of pulverizing the lithium powder.

Control Example 1

Placing a 5 g battery-grade lithium foil (with a thickness of 0.05 mm) into a 200 ml plastic bottle loaded with 45 g cyclohexane; filling argon to protect and hermetically seal, processing for 15 min in a 100 W ultrasonic instrument at a processing temperature of 60° C., filtering and vacuum drying, and then obtaining metal lithium powder. The resulting metal lithium powder has an effect approximate to the vacuum ultrasonic pulverization. However, it may be clearly seen from the XRD pattern (FIG. 4) that besides the phase of Li, it also includes the impurity of LiOH. Production of the LiOH might be caused by reaction of the active lithium powder with trace water and dissolved oxygen or other substance in the organic resolvent.

Making a 2032-type coin cell using the prepared metal lithium powder in control example 1 according to the scheme in Embodiment 1 and the cell performance was evaluated by the discharge test under the same condition. The discharge capacity of the metal lithium powder may reach 2829 mAh/g, 73.3% of its theoretical discharge capacity (3860 mAh/g). It may be seen that production of the LiOH impurity phase apparently reduces the discharge capacity of the metal lithium.

Control Example 2

Placing a 0.5 g battery-grade lithium foil (with a thickness of 0.05 mm) into a 50 ml plastic bottle loaded with 9.5 g dimethyl silicon oil with a viscosity of 1000 mPa·s; vacuum-pumping to 0.06 MPa, hermetically sealing, processing for 120 min in a 100 W ultrasonic instrument at a processing temperature of 60° C.; the lithium foil substantially has no change. The result shows that the viscosity of the organic resolvent has a significant impact on the metal lithium pulverization effect.

The above description of the preferred embodiments of the present disclosure is not intended to limit the present disclosure. Those skilled in the art may make some modifications based on the present disclosure, which should all fall into the scope defined by the appended claims of the present disclosure without departing from the spirit of the present disclosure.

What is claimed is:

1. A metal lithium powder, wherein a morphology of the metal lithium powder is a flake structure, wherein the metal lithium powder consists of lithium and has a thickness of 10~50 μm, a width of 100~300 μm, and a width-to-thickness ratio of 6·30 and the metal lithium powder is prepared by:
   (a) placing a 0.5 g battery-grade lithium foil with a thickness of 0.05 mm into a 50 ml plastic bottle loaded with 9.5 g dimethyl carbonate;
   (b) vacuum-pumping to 0.06 MPa;
   (c) hermetically sealing, processing for 5 min in a 100W ultrasonic instrument at a processing temperature of 60° C.;
   (d) filtering and vacuum drying to remove the 9.5 g dimethyl carbonate; and
   (e) obtaining metal lithium powder.

* * * * *